United States Patent
Steidl et al.

(10) Patent No.: US 12,157,340 B2
(45) Date of Patent: Dec. 3, 2024

(54) SPRING SYSTEM HAVING A WIDE-BAND INSULATING EFFECT

(71) Applicant: Hasse & Wrede GmbH, Berlin (DE)

(72) Inventors: Michael Steidl, Berlin (DE); Norbert Reinsperger, Hoppegarten (DE); Robert Kempgen, Berlin (DE); Mandy Streifler, Berlin (DE)

(73) Assignee: Hasse & Wrede GmbH, Berlin (DE)

( * ) Notice: Subject to any disclaimer, the term of this patent is extended or adjusted under 35 U.S.C. 154(b) by 215 days.

(21) Appl. No.: 17/920,985

(22) PCT Filed: May 3, 2021

(86) PCT No.: PCT/EP2021/061561
§ 371 (c)(1),
(2) Date: Oct. 24, 2022

(87) PCT Pub. No.: WO2021/224177
PCT Pub. Date: Nov. 11, 2021

(65) Prior Publication Data
US 2023/0182522 A1    Jun. 15, 2023

(30) Foreign Application Priority Data
May 6, 2020   (DE) .................. 10 2020 112 209.8

(51) Int. Cl.
*B60G 13/18*   (2006.01)
*B60G 17/027*  (2006.01)

(52) U.S. Cl.
CPC .......... *B60G 13/18* (2013.01); *B60G 17/027* (2013.01); *B60G 2202/25* (2013.01);
(Continued)

(58) Field of Classification Search
CPC .............. B60G 13/18; B60G 2500/10; B60G 2500/22; B60G 2202/25; B60G 2202/30;
(Continued)

(56) References Cited

U.S. PATENT DOCUMENTS

| 5,732,803 A | 3/1998 | Breitbach et al. |
| 7,316,303 B2 * | 1/2008 | Smith .............. F16F 9/16 188/312 |

(Continued)

FOREIGN PATENT DOCUMENTS

| CN | 203717774 U | * | 7/2014 |
| CN | 103470680 B | * | 11/2015 |

(Continued)

OTHER PUBLICATIONS

International Search Report (PCT/ISA/210) issued in PCT Application No. PCT/EP2021/061561 dated Aug. 31, 2021 with English translation (seven (7) pages).

(Continued)

*Primary Examiner* — James A English
(74) *Attorney, Agent, or Firm* — Crowell & Moring LLP

(57) ABSTRACT

A spring system of a vehicle, in particular a utility vehicle, includes a first spring/damper unit with a first stiffness and a first damping; a second spring/damper unit with a second stiffness and a second damping; and an additional mass as a tuned-mass absorber. The tuned-mass absorber is coupled to at least one negative stiffness. A vehicle having such a spring system and a method for adapting the stiffness of a spring system are provided.

17 Claims, 10 Drawing Sheets

(52) U.S. Cl.
CPC .... *B60G 2202/413* (2013.01); *B60G 2300/02* (2013.01); *B60G 2500/10* (2013.01)

(58) Field of Classification Search
CPC ............ B60G 2202/32; F16F 2228/063; F16F 2232/06; F16F 7/1022; F16F 15/022
See application file for complete search history.

(56) References Cited

U.S. PATENT DOCUMENTS

| | | | | |
|---|---|---|---|---|
| 8,044,629 | B2* | 10/2011 | Fallahi | .................. F16F 7/1005 318/116 |
| 2004/0099455 | A1 | 5/2004 | Nagaya | |
| 2004/0212132 | A1* | 10/2004 | Tanner | ................... B60G 13/14 267/140.11 |
| 2010/0057260 | A1* | 3/2010 | Fallahi | ................. G05B 13/042 188/379 |
| 2016/0347144 | A1* | 12/2016 | Suissa | .................... B60G 17/00 |
| 2018/0162187 | A1 | 6/2018 | Trangbaek | |

FOREIGN PATENT DOCUMENTS

| | | | | |
|---|---|---|---|---|
| CN | 106151363 | A | * | 11/2016 |
| CN | 205937624 | U | * | 2/2017 |
| CN | 108691945 | A | | 10/2018 |
| CN | 109356961 | A | * | 2/2019 ............ F16F 15/022 |
| CN | 108240415 | B | | 4/2020 |
| CN | 111140616 | A | | 5/2020 |
| DE | 195 41 600 | C1 | | 7/1997 |
| GB | 2 431 450 | A | | 4/2007 |
| JP | 2007-285429 | A | | 11/2007 |
| JP | 2018-69949 | A | | 5/2018 |
| JP | 2018-76954 | A | | 5/2018 |
| WO | WO 02/083446 | A1 | | 10/2002 |

OTHER PUBLICATIONS

German-language Written Opinion (PCT/ISA/237) issued in PCT Application No. PCT/EP2021/061561 dated Aug. 31, 2021 (seven (7) pages).

German-language Office Action issued in German Application No. 10 2020 112 209.8 dated Nov. 19, 2020 (six (6) pages).

Kapasakalis et al., "Frequency Base Design of the KDamper Concept for Seismic Isolation of Bridges," Proceedings of the 14th International Conference on Vibration Problems, 2021, pp. 169-191 (16 pages).

Antoniadis et al., "KDamping: A Stiffness based vibration absorption concept," Journal of Vibration and Control, Feb. 1, 2018, pp. 588-606, vol. 24, No. 3 (28 pages).

Sapountzakis et al., "Implementation of the KDamper concept using disc springs," Journal of Low Frequency Noise, Vibration and Active Control, Mar. 1, 2019, pp. 168-186, vol. 38, No. 1 (19 pages).

Japanese-language Office Action issued in Japanese Application No. 2022-567336 dated Nov. 8, 2023 with English translation (5 pages).

Sapountzakis et al., "Frequency Based Design of KDamper for Seismic Isolation of a Single Pier Concrete Bridge," International Journal of Geoengineering Case Histories, 2018, pp. 289-305, vol. 4, issue 4 (18 pages).

* cited by examiner

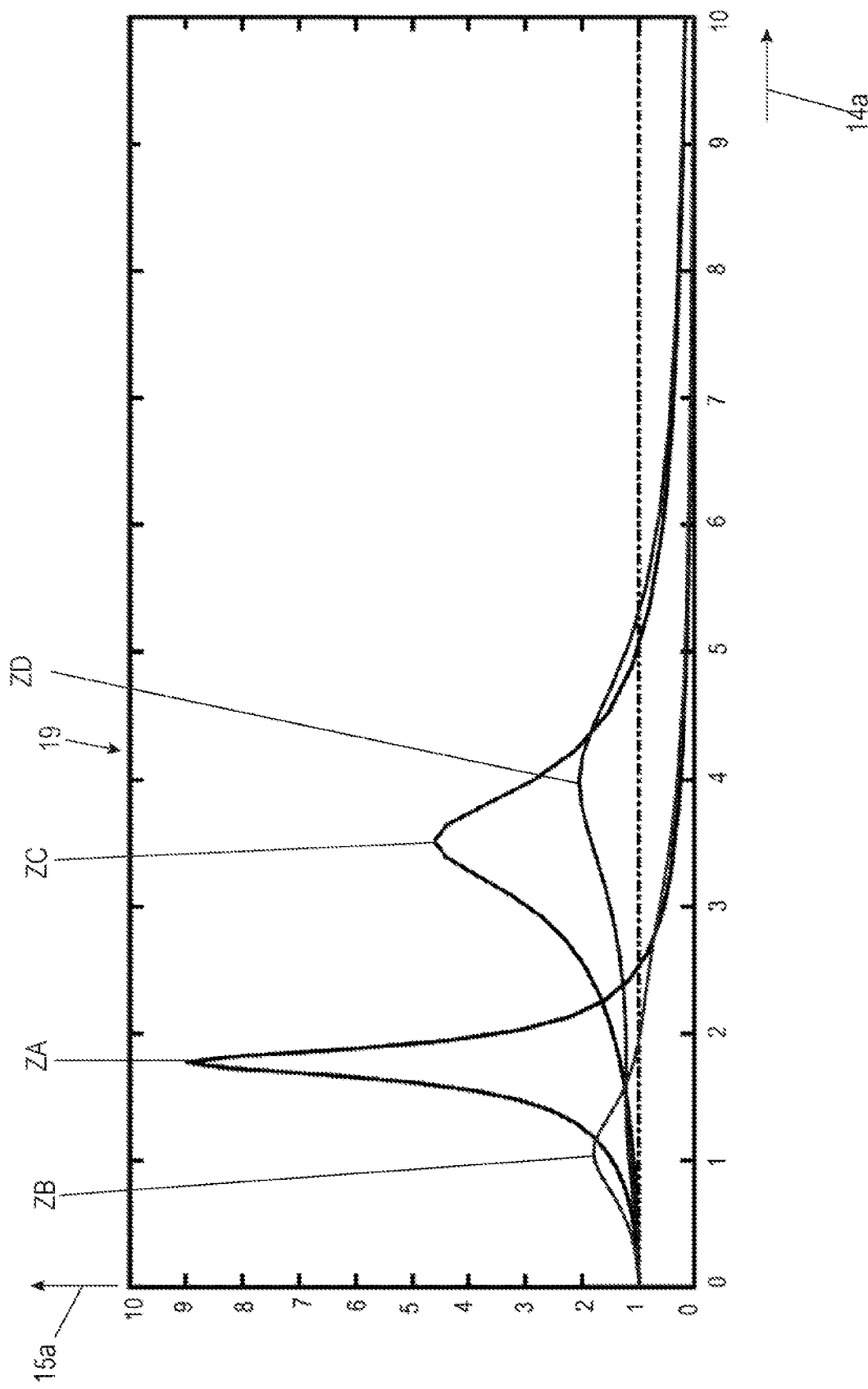

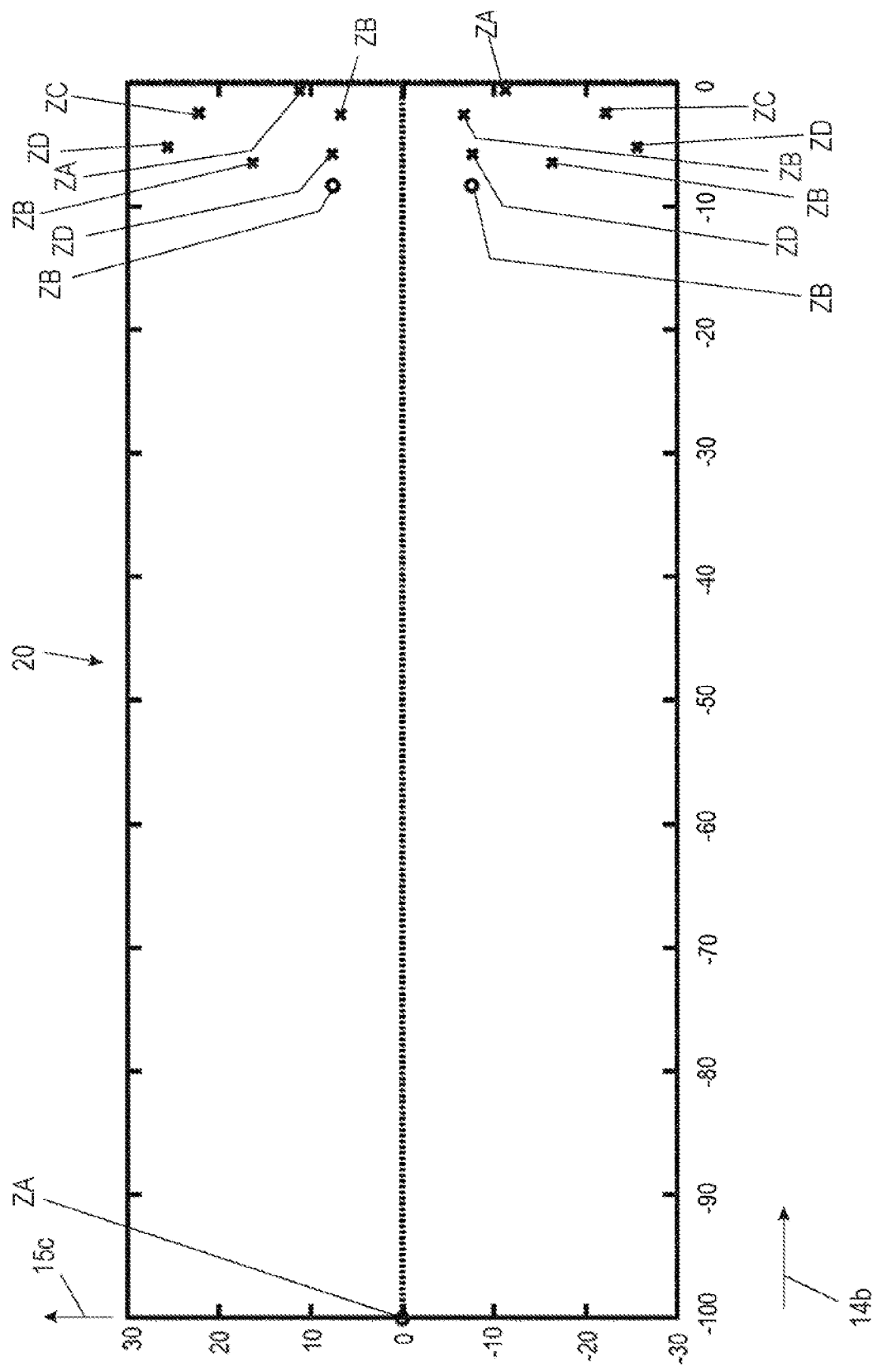

SPRING SYSTEM HAVING A WIDE-BAND INSULATING EFFECT

BACKGROUND AND SUMMARY

The invention relates to a spring system and, in particular, a spring system for utility vehicles. The invention also relates to a method for adapting the stiffness of a spring system of a vehicle.

Spring systems for utility vehicles, tractors and trailers are provided with pneumatic springs. Said pneumatic springs have the advantage that a stiffness of the pneumatic springs can be effectively adapted to the loading of the respective utility vehicle. Consequently, it is firstly possible for level regulation to be realized, and it is secondly possible for an isolation frequency, that is to say the frequency above which vibrations are no longer transmitted, to be adapted to the loading state and, in this way, to be kept approximately constant.

Here, it is considered to be a disadvantage that pneumatic springs require compressed air, for which purpose compressors are necessary. There is room for improvement for isolation, too.

In future electric utility vehicles, there will possibly no longer be any air compressors. This results in the disadvantage that pneumatic springs can longer be used too.

In the area of seismic isolation of buildings, a device referred to as KDamper, which has negative stiffnesses, is presently being discussed. This is described for example by the document "Frequency Base Design of the KDamper Concept for Seismic Isolation of Bridges" (Konstantinos A. Kapasakalis[1], Christos-Habib T. Alamir[1], Ioannis A. Antoniadis[2], and Evangelos J. Sapountzakis[1]—[1]Institute of Structural Analysis and Antiseismic Research, School of Civil Engineering, National Technical University of Athens, Zografou Campus, GR-157 80 Athens, Greece, [2]Dynamics and Structures Laboratory, Mechanical Engineering Department, National Technical University of Athens, Zografou Campus, GR-157 80 Athens, Greece).

CN 108 240 415 B relates to a highly loadable, highly damping vibration-reduction device of a dynamic vibration damper composed of a curved bar/plate structure with negative stiffness. The dynamic vibration damper is embedded into the vibration-reduction device. The vibration-reduction device comprises an upper connecting piece, an elastic element and a lower connecting piece, and the elastic element is connected between the upper connecting piece and the lower connecting piece. The dynamic vibration damper comprises an elastic body, a mass block and an assembled, curved bar/plate structure which are arranged one after the other; the elastic body is connected to the upper connecting piece; the assembled, curved bar/plate structure comprises an element with negative stiffness, which is connected to the mass block; when the vibration-reduction device is subjected to the action of the rated load, the elastic element and the dynamic vibration damper can be simultaneously compressed, so that the assembled, curved bar/plate structure is at a working point with negative stiffness. The dynamic vibration damper is embedded in the vibration-reduction device, the element with negative stiffness is adopted to provide an equivalent inertial force, the technological measures allow the vibration-reduction device to meet wide-band vibration isolation requirements, and a high level of damping at the peak value is achieved with the small mass.

CN 111 140 616 A describes a nonlinear vibration damper with negative stiffness and relates to the technical area of shock absorption. The nonlinear vibration damper, which is improved by the negative stiffness, comprises an outer frame, a guide rail, a hollow mass block, a module with negative stiffness, a buffer module and first springs, wherein the module with negative stiffness comprises a solid mass block and second springs.

It is therefore the object of the invention to provide a spring system without adjustable pneumatic springs with simultaneously improved vibration isolation for, as far as possible, all the loading states.

A basis of the concept of the invention lies in the fact that use is made of a system composed of primary suspension and damping in combination with a tuned-mass absorber (TMA). The TMA is additionally coupled via a negative stiffness. Such a system is presently not in use in the area of automotive engineering.

A spring system according to the invention of a vehicle, in particular a utility vehicle, comprises a first spring/damper unit with a first stiffness and a first damping; a second spring/damper unit with a second stiffness and a second damping; and an additional mass as tuned-mass absorber TMA. The tuned-mass absorber TMA is coupled to at least one negative stiffness.

The coupling to the negative stiffness yields the advantage of keeping the mass of the TMA small, on the one hand, and of significantly improving the isolation, on the other hand.

A vehicle, in particular a utility vehicle, according to the invention having wheels and spring systems, wherein the wheels are coupled to the vehicle via the spring systems, has the above-described spring system.

In a particularly preferred embodiment, a translational transmission is arranged between the tuned-mass absorber TMA and the at least one negative stiffness.

This is particularly advantageous since a displacement of the TMA that is as large as possible is simultaneously advantageous for this being able to be of lightweight design and being highly effective.

In this way, it is advantageously possible for a solution to be able to be found to the main problem in realization for a spring system with very effective vibration isolation for all the loading states. This main problem is that the required component for realizing the negative mechanical stiffness can be realized only in a very complex manner as hardware. Systems having negative stiffness normally do this only in a very restricted working range. Examples are for example plate springs, which are operated at the 'breakthrough point'. Solutions that exhibit negative stiffness over a relatively large working range or relatively large transverse displacement are active elements, in the case of which the mechanical behavior has to be realized via regulation. Such components are very expensive. The solution according to the invention is therefore a great advantage.

A method according to the invention for adapting the stiffness of a spring system of a vehicle, in particular a utility vehicle, as claimed in one of the preceding claims comprises the method steps (S1) providing a spring system which has a first spring/damper unit with a first stiffness and a first damping, a second spring/damper unit with a second stiffness and a second damping, and an additional mass as tuned-mass absorber TMA; (S2) coupling the at least one negative stiffness to the tuned-mass absorber TMA; and (S3) adapting the stiffness of the spring system and simultaneously isolating a vehicle body by means of the at least one negative stiffness coupled to the tuned-mass absorber TMA.

In one embodiment, the translational transmission has bars with a respective longitudinal axis and transmission wheels, wherein the bars are in engagement with the transmission wheels. This results in an advantageously simple construction.

If the bars and the transmission wheels are in engagement via toothings, use may be made of customary components with conventional toothing of appropriate quality and low costs.

In a further embodiment, the transmission wheels are arranged in a manner connected so as to be rotatable about a common axis of rotation and so as to be rotationally conjoint with respect to one another, wherein the bars are arranged in a manner in each case guided and mounted in a longitudinal bearing arrangement so as to be displaceable along their longitudinal axes. A compact construction is thus possible.

In a yet further embodiment, a ratio of the translational movement of the bars along their respective longitudinal axis is defined in simple manner via the ratio of the radii of the transmission wheels.

One embodiment provides that one bar, which engages with one transmission wheel, which has a smaller radius in comparison with the other transmission wheel, is connected to the at least one negative stiffness, wherein the other bar engages with the other transmission wheel, which has the larger radius, and is connected to the tuned-mass absorber TMA.

The translational transmission is used between the TMA and the negative stiffness. In this way, it is possible for a small displacement of the element with negative stiffness, that is to say for example a plate spring, and a large amplitude of the TMA to be realized simultaneously, wherein, via the translational transmission, the TMA is still in direct operative connection with the mechanical element with negative stiffness and the desired mechanical behavior can consequently be set.

In a yet further embodiment, the translational transmission has an adjustment drive with a drive wheel, wherein the drive wheel is in engagement with one of the transmission wheels.

The adjustment drive may for example be an electric motor, by way of which, via the drive wheel, a working point of the translational transmission and thus of the spring system can be set or level regulation can be realized, which level regulation is required for example for loading on a ramp.

In an alternative embodiment, the adjustment drive may be a hydraulic motor. Said hydraulic motor may be driven hydraulically and/or by means of an electric motor. These components are available in high quality at low cost.

In an alternative embodiment, the translational transmission may be a hydraulic transmission. This is advantageous since the functional units required for this purpose are commercially available components.

In one embodiment, the translational transmission, as a hydraulic transmission, comprises hydraulic pistons which have different piston surface areas for realizing transmission ratios. This is simple to realize.

Moreover, the translational transmission, as a hydraulic transmission, may have an adjustment drive as a hydraulic pump or hydraulic motor. In this way, a compact construction is made possible.

In an alternative embodiment, the adjustment drive may have an electric drive component and a hydraulic outlet which interacts with the hydraulic transmission. In this way, an advantageous extension of the range of use is achieved through adaptation to different boundary conditions.

A further embodiment of the method provides that the at least one negative stiffness is coupled to the tuned-mass absorber TMA by means of a translational transmission, and that the adaptation of the stiffness of the spring system and simultaneous isolation of a vehicle body are realized by means of the translational transmission coupled to the at least one negative stiffness. Consequently, a particularly great advantage is achieved since a small displacement of the negative stiffness can be enlarged by means of the transmission.

In a further embodiment of the method, a setting of a working point of the translational transmission and/or a regulation of a level of the vehicle body are/is realized by means of an adjustment drive which engages with the translational transmission.

One embodiment provides that the at least one negative stiffness has at least one plate spring or at least one leaf spring. These components are commonly available on the market in high quality at low cost.

Exemplary embodiments of the invention will be described below on the basis of the appended drawings.

BRIEF DESCRIPTION OF THE DRAWINGS

FIGS. 9-12 show representations of functions.

DETAILED DESCRIPTION OF THE DRAWINGS

Figure 1:
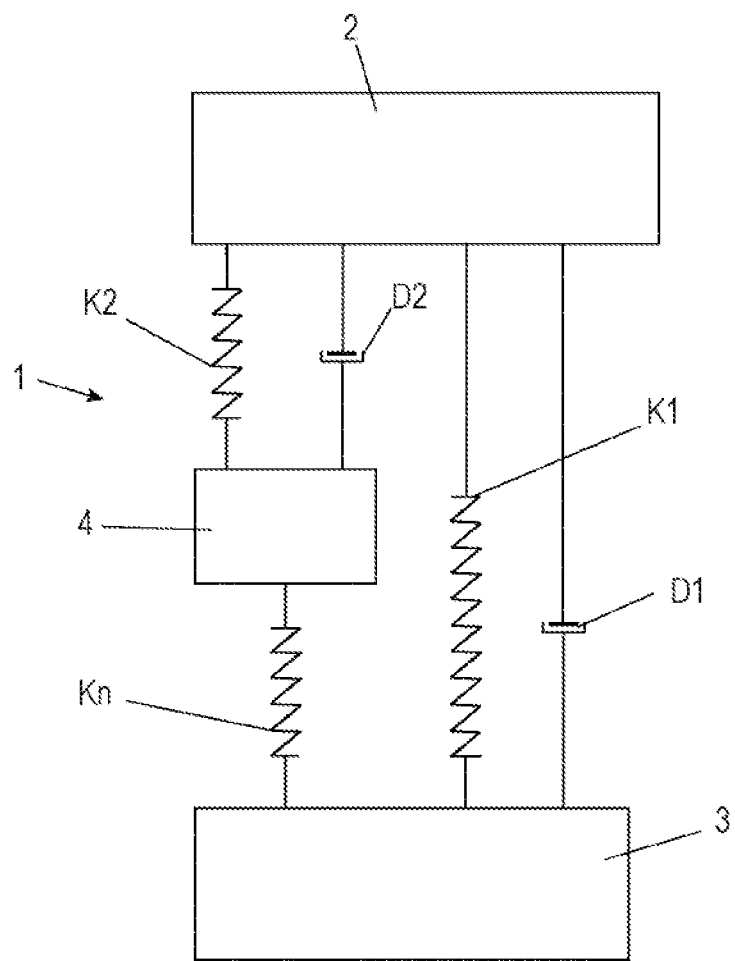
FIG. 1 shows a schematic operating diagram of a first exemplary embodiment of a spring system according to the invention with a tuned-mass absorber.

FIG. 1 shows a schematic operating diagram of a first exemplary embodiment of a spring system 1 according to the invention with a tuned-mass absorber TMA 4 in a vehicle. The abbreviation TMA will be used hereinafter for the tuned-mass absorber 4.

The spring system 1 is arranged between a mass of a vehicle body 2 of the vehicle and a wheel 3. The vehicle body 2 is to be understood as meaning that part of a vehicle which is supported by the wheels of the vehicle. The wheels, in part by way of their suspensions and bearing arrangements, are movably fastened to the vehicle in a known manner. The vehicle is not shown. It is preferably a utility vehicle, a tractor, or a trailer.

The spring system 1 comprises here a first spring/damper unit with a first stiffness K1 and a first damping D1, a second spring/damper unit with a second stiffness K2 and a second damping D2, an additional mass as tuned-mass absorber (TMA) 4, and a negative stiffness Kn.

The first spring/damper unit with the first stiffness K1 and the first damping D1 is arranged between the vehicle body 2 and the wheel 3. The tuned-mass absorber 4 is articulated on the vehicle body 2 via the second stiffness K2 and the second damping D2, at one side, and is articulated on the wheel 3 via the negative stiffness Kn, at the other side.

The TMA 4, in combination with primary suspension and damping, is, in the case of this spring system 1, additionally coupled to the negative stiffness Kn in order to keep the mass of the TMA 4 small, on the one hand, and to significantly improve the isolation, that is to say the isolation frequency, on the other hand.

The negative stiffness Kn may be realized in the first exemplary embodiment for example by plate springs and/or leaf springs, which are operated at the so-called breakthrough point. However, in this case, the working range, that is to say a range of loading states of the associated vehicle, is greatly restricted. This embodiment could thus be used for small utility vehicles and also for passenger motor vehicles.

Figure 2:
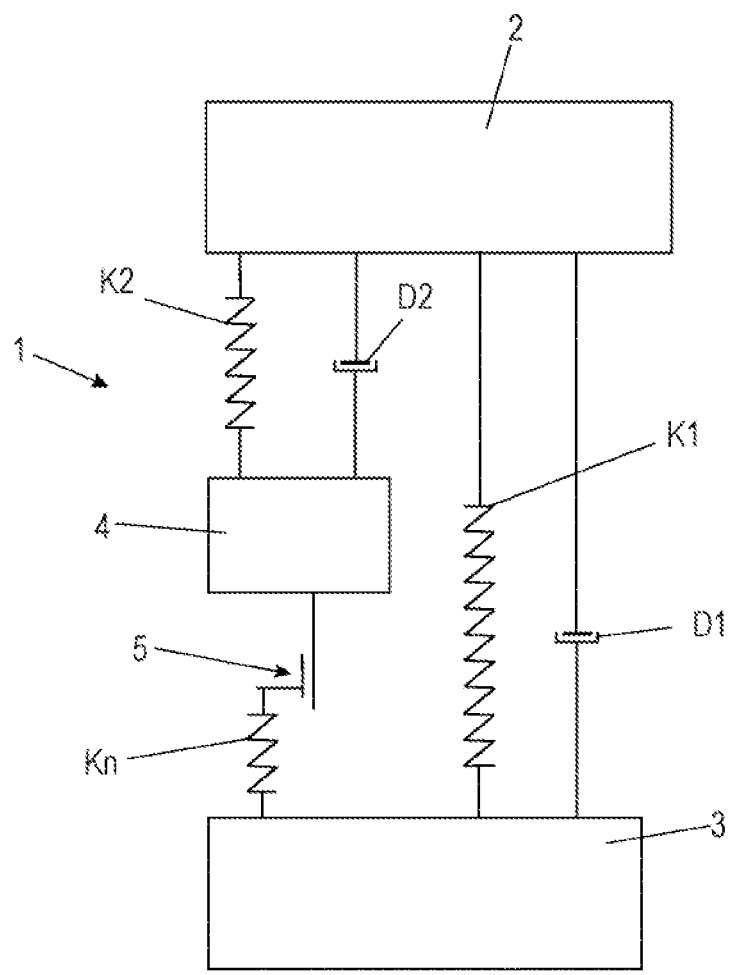
FIG. 2 shows a schematic operating diagram of a second exemplary embodiment of the spring system according to the invention with a tuned-mass absorber.

Such a restriction can be overcome by the second exemplary embodiment of the spring system 1 according to the invention with a TMA 4, the operating diagram of which is illustrated in FIG. 2.

By contrast to the first exemplary embodiment as per FIG. 1, here, a transmission 5 is arranged between the TMA 4 and the negative stiffness Kn. In this way, it is possible for a small displacement of the element with the negative stiffness Kn, that is to say for example a plate spring (or else multiple plate springs), and a large amplitude of the TMA 4 to be able to be realized simultaneously. In this case, via the transmission 5, the TMA 4 is still in direct operative connection with the mechanical element(s) with the negative stiffness Kn, which for its/their part is/are connected to the wheel 3. Consequently, a desired mechanical behavior can be advantageously set. The transmission 5 will be discussed in more detail below. In this example, the transmission 5 is in the form of a translational transmission.

Figure 3:
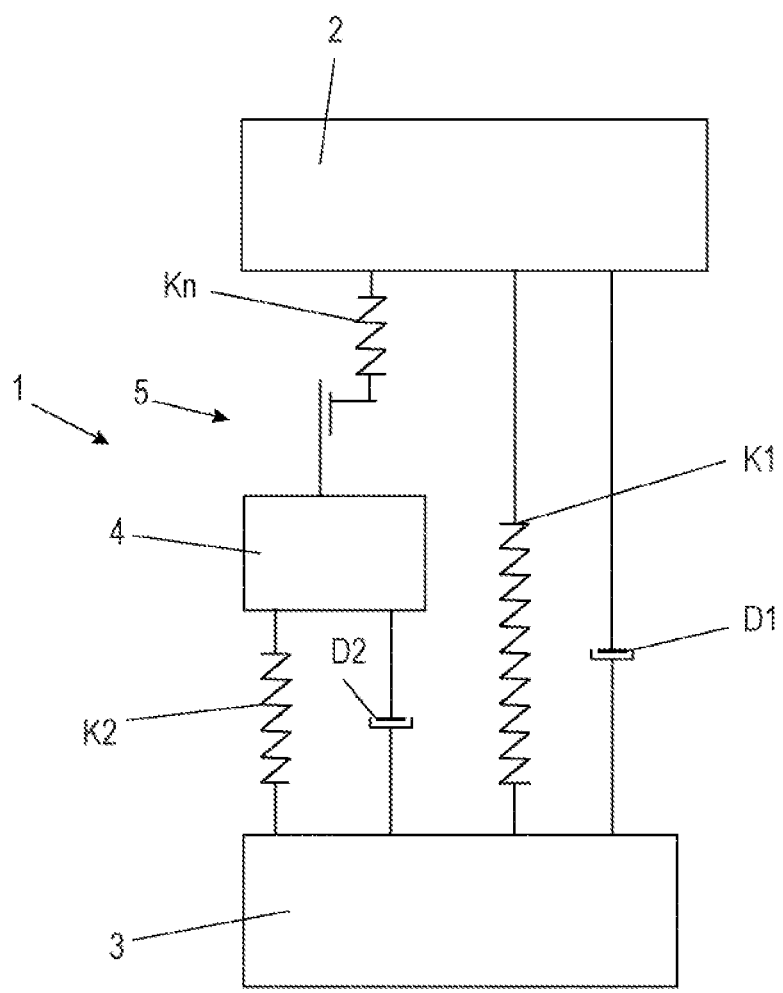
FIG. 3 shows a schematic operating diagram of a variant of the second exemplary embodiment as per FIG. 2.

FIG. 3 shows a schematic operating diagram of a variant of the second exemplary embodiment as per FIG. 2.

Said variant differs from the second exemplary embodiment in that the negative stiffness Kn is arranged between the vehicle body 2 and the TMA 4.

The arrangements according to the second exemplary embodiment and its variant can make possible adaptations to different installation situations.

Figure 4:
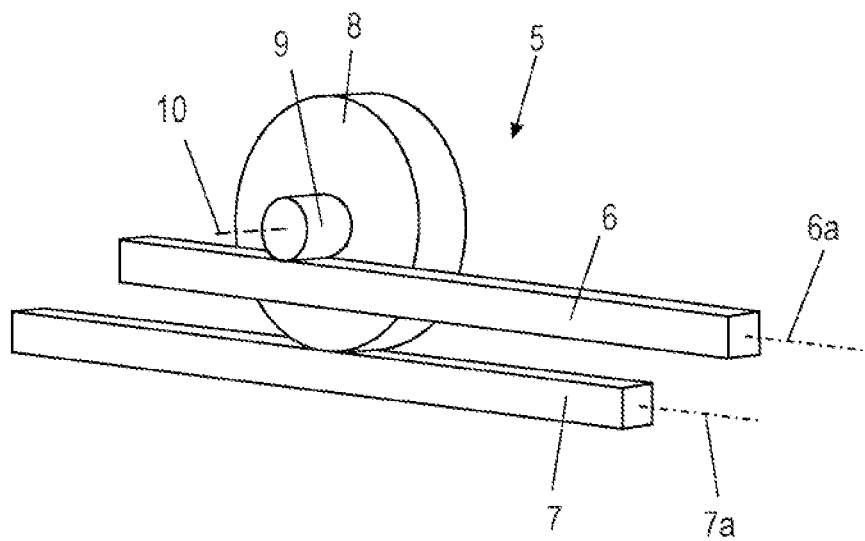
FIGS. 4-5 show schematic views of an exemplary realization of a translational transmission.

One possible realization of the translational transmission 5 is illustrated in the configuration as per FIG. 4.

In this example, the translational transmission 5 has two bars 6, 7 with a respective longitudinal axis 6a, 7a. The bars 6, 7 engage with transmission wheels 8, 9. The transmission wheels 8, 9 are illustrated merely schematically with a respective cylindrical shape.

The engagements are configured here for example as toothing engagements. The transmission wheels 8, 9 are then gearwheels which engage with toothings of the bars 6, 7, which are in this case designed as toothed racks.

The transmission wheels 8, 9 are moreover connected so as to be rotatable about a common axis of rotation 10 and so as to be rotationally conjoint with respect to one another. A rotary bearing arrangement for the axis of rotation 10 or the transmission wheels 8, 9 on the axis of rotation is not illustrated, but is easily provided.

The bars 6, 7 are in each case guided and mounted in a longitudinal bearing arrangement (not shown) so as to be displaceable along their longitudinal axes 6a, 7a.

A ratio of the translational movement of the two bars 6, 7 along their respective longitudinal axis 6a, 7a is defined via the ratio of the radii of the transmission wheels 8, 9.

In the example shown here, the bar 6, which engages with the transmission wheel 9, which has a smaller radius in comparison with the transmission wheel 8, is connected to the element with the negative stiffness Kn. The other bar 7 engages with the transmission wheel 8, which has the larger radius, and is connected to the TMA 4.

During operation, the bar 6 engaging with the transmission wheel 9 covers a short distance in the direction of the longitudinal axis 6a of the bar 6, while the other bar 7, which engages with the transmission wheel 8, moves a long distance in the direction of its longitudinal axis 7a. The two bars 6, 7 move in the same direction along their longitudinal axis 6a, 7a owing to the rotationally conjoint connection of the transmission wheels 8, 9.

It is however also contemplated for the transmission wheels 8 and 9 to be coupled by way of a further transmission, such as for example a planetary transmission, which is arranged in the large transmission wheel 8. In this way, it is also possible for other transmission ratios to be made possible, for example in the case of restricted structural space.

Figure 5:
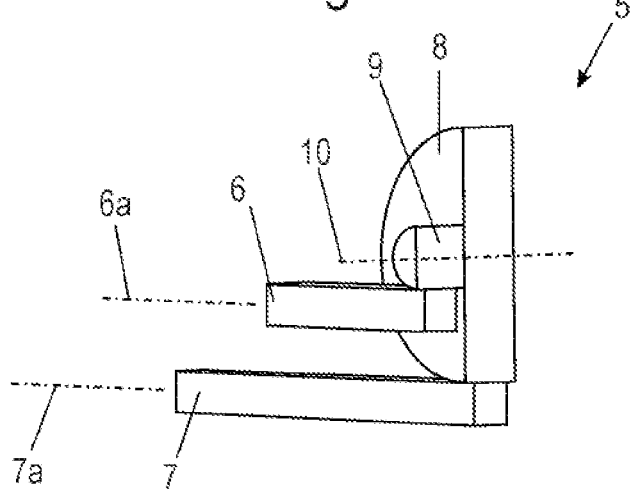

FIG. 5 shows a sectional illustration of the translational transmission 5 as per FIG. 3 in a plane of the axis of rotation 10 of the transmission wheels 8, 9 perpendicular to the longitudinal axes 6a, 7a of the bars 6, 7.

Here, the axis of rotation 10 is arranged at a right angle to the longitudinal axes 6a, 7a of the bars 6, 7. Other angular positions between the axis of rotation 10 and the longitudinal axes 6a, 7a are also possible, according to the type of toothing.

Figure 6:
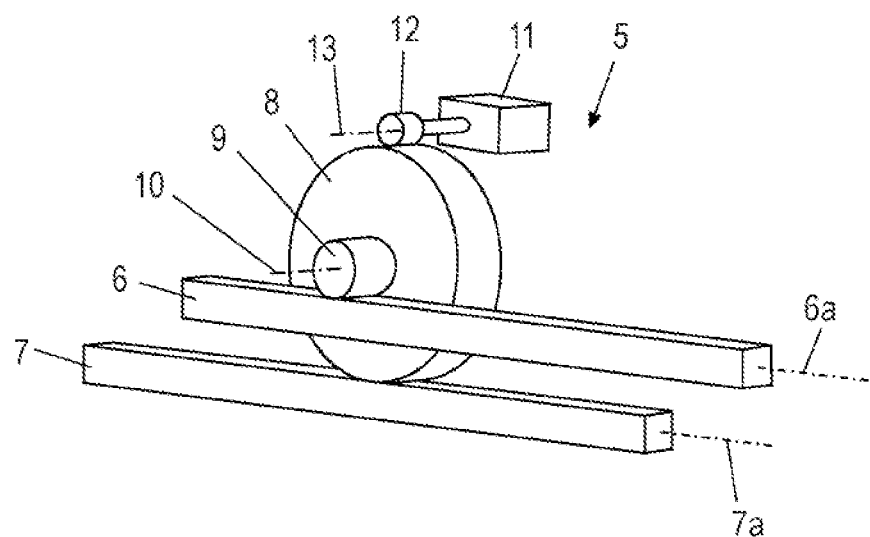
FIGS. 6-7 show schematic views of a further exemplary realization of a translational transmission.
Figure 7:
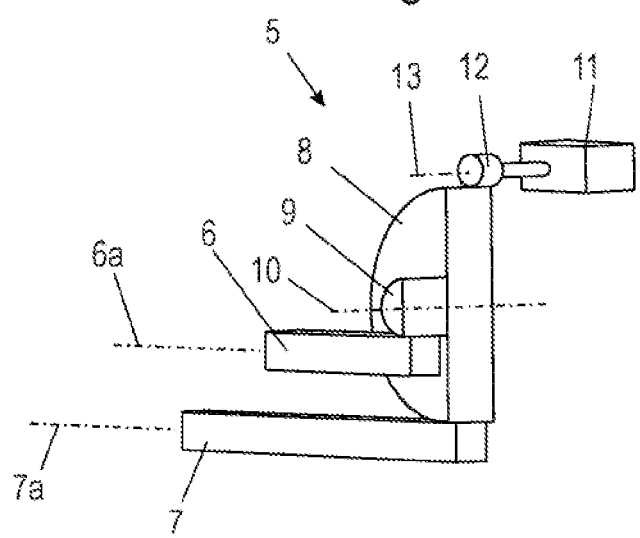

FIG. 6 illustrates a schematic view of a further exemplary realization of the translational transmission 5. FIG. 7 shows in this respect, similarly to FIG. 5, a sectional illustration of the translational transmission 5 as per FIG. 6.

In FIG. 6, provision is additionally made of an adjustment drive 11 with a drive wheel 12. The drive wheel 12 is likewise illustrated merely schematically as a cylinder, and engages here with the first transmission wheel 8 and is here a gearwheel. It is also contemplated for the drive wheel 12 to be able to engage with the other transmission wheel 9.

By means of the adjustment drive 11, a working point of the transmission 5 can be set via the drive wheel 12. In this way, level regulation of the associated vehicle can be realized, which level regulation is required for example for loading/unloading on a ramp and/or for the loading state.

In one embodiment (not shown but contemplated), the translational transmission 5 is realized as a hydraulic transmission by means of a hydraulic arrangement. In this regard, it would possible for example for the bars 6, 7 to be connected to hydraulic pistons which have different piston surface areas for realizing transmission ratios.

The adjustment drive 11 may in this case be designed as an additional hydraulic pump or hydraulic motor.

It is also contemplated for the adjustment drive 11 to have an electric drive component and a hydraulic outlet which interacts with the hydraulic transmission.

Figure 8:
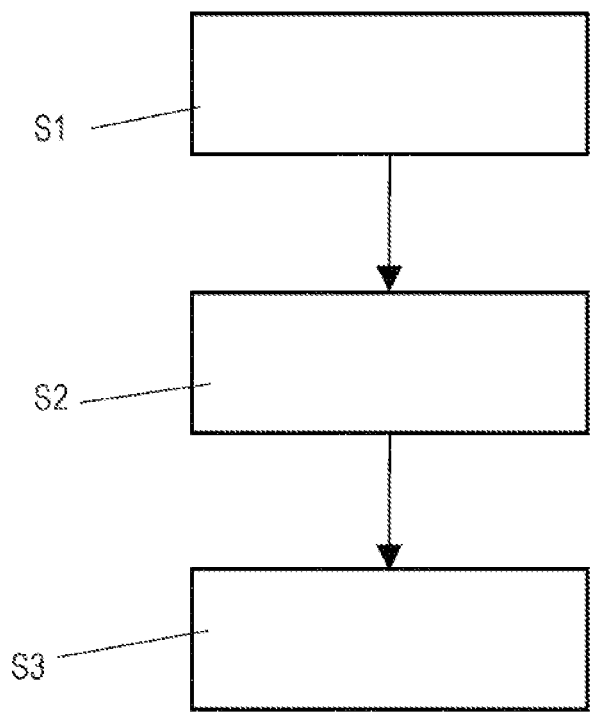
FIG. 8 shows a schematic flow diagram of a method according to the invention.

FIG. 8 shows a schematic flow diagram of a method according to the invention for adapting the stiffness of a spring system 1 of a vehicle, in particular a utility vehicle.

In a first method step S1, provision is made of a spring system 1 which has a first spring/damper unit with a first stiffness K1 and a first damping D1, a second spring/damper unit with a second stiffness K2 and a second damping D2, an additional mass as tuned-mass absorber (TMA) 4, and a negative stiffness Kn.

A second method step S2 provides that the negative stiffness Kn is coupled to the TMA 4 via a translational transmission 5.

Finally, in a third method step S3, adaptation of the stiffness of the spring system 1 and simultaneous isolation of a vehicle body 2 are realized by means of the translational transmission 5 coupled to the negative stiffness Kn. A setting of a working point of the translational transmission 5 and/or a regulation of a level of the vehicle body 2 are/is performed by an adjustment drive 11 which engages with the translational transmission 5.

FIGS. 9-12 show graphical representations of functions, in particular function graphs of transmission functions.

Simulations of different usage situations of the spring system 1 according to the invention have been carried out and have yielded positive results, which are illustrated below by FIGS. 9-12.

These illustrate the improvements of the isolation, both for a loaded state and for the empty vehicle, in particular utility vehicle, in the comparison of provision and non-provision of the spring system 1 according to the invention.

In this respect, the graphs ZA illustrate the loaded state without spring system 1, and the graphs ZB illustrate the loaded state with spring system 1. The graphs ZC correspond to the empty state without spring system 1, and the graphs ZD indicate the empty state with spring system 1.

Figure 9:
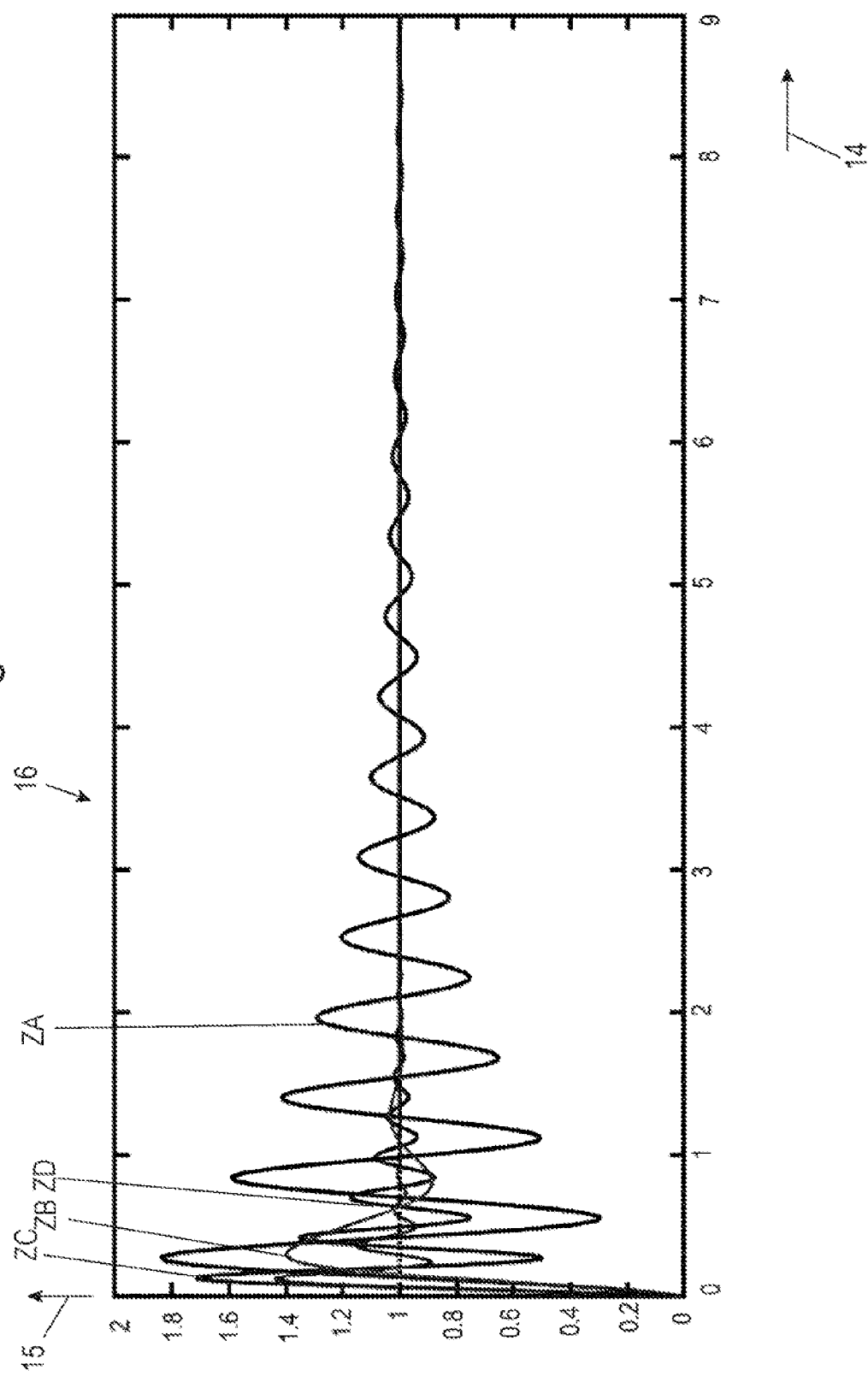

In FIG. 9, the step responses 16 are plotted as amplitude 15 over time 14.

In this regard, it can be seen that the respective amplitude 15 of the graphs ZB and ZD with spring system 1, in comparison with the graphs ZA and ZC without spring system 1, can be reduced to a very great extent in such a way that only a very much smaller proportion of shocks and unevennesses due to the roadway reach or are transmitted to the luggage compartment interior or the body of the vehicle.

Figure 10:
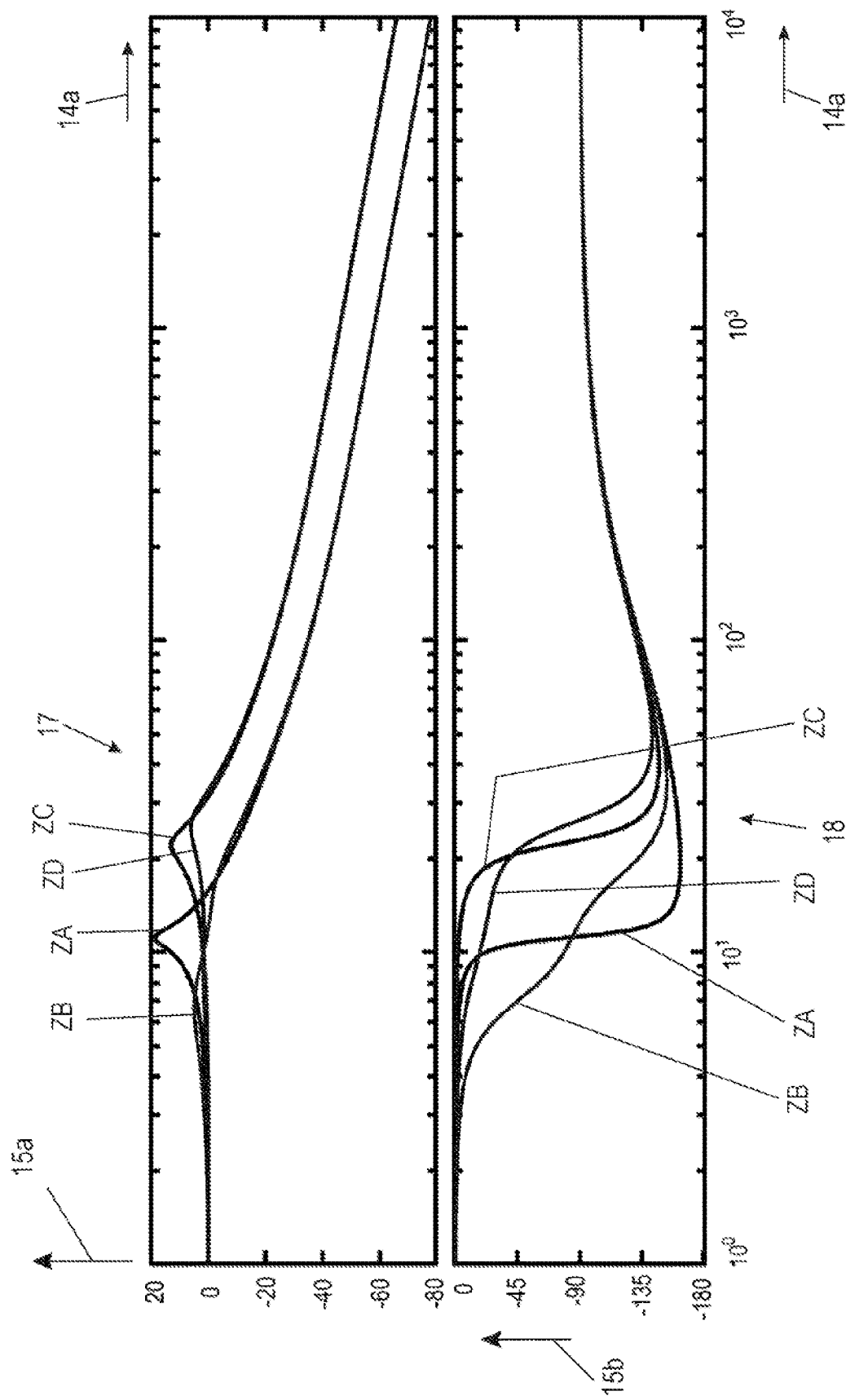

FIG. 10 shows the magnitude 15a and the phase 15b of a Bode plot 17, 18 over time 14a on a logarithmic scale.

In FIG. 11, the magnitude 15a of the Bode plot 19 is plotted linearly over time 14a.

Finally, FIG. 12 shows in this respect poles and zeros 20 with imaginary part 15c and real part 14b.

The invention is not restricted by the exemplary embodiment specified above, but can be modified within the scope of the claims.

It is contemplated for multiple negative stiffnesses Kn to be able to be arranged in a parallel manner or one behind the other or in combinations thereof.

LIST OF REFERENCE SIGNS

1 Spring system
2 Vehicle body
3 Chassis
4 TMA
5 Transmission
6, 7 Bar
6a, 7a Longitudinal axis
8, 9 Transmission wheel
10 Axis of rotation
11 Adjustment drive
12 Drive wheel
13 Drive axis
14 Time
14a Frequency
14b Real part
15 Amplitude
15a Magnitude
15b Phase
15c Imaginary part
16 Step response
17, 18, 19 Bode plot
20 Poles and zeros
D1, D2 Damping
K1, K2 Stiffness
Kn Negative stiffness
S1, S2, S3 Method step
x Displacement
ZA, ZB, ZC, ZD Graph

The invention claimed is:

1. A spring system of a vehicle, comprising:
a first spring/damper unit with a first stiffness K1 and a first damping D1;
a second spring/damper unit with a second stiffness K2 and a second damping D2;
an additional mass as a tuned-mass absorber;
at least one negative stiffness Kn, wherein the tuned-mass absorber is coupled to the at least one negative stiffness; and
a translational transmission arranged between the tuned-mass absorber and the at least one negative stiffness.

2. The spring system as claimed in claim 1, wherein
the translational transmission has bars with a respective longitudinal axis, and has transmission wheels, and
the bars are in engagement with the transmission wheels.

3. The spring system as claimed in claim 2, wherein
the bars and the transmission wheels are in engagement via toothings.

4. The spring system as claimed in claim 2, wherein
the transmission wheels are arranged in a manner connected so as to be rotatable about a common axis of rotation and so as to be rotationally conjoint with respect to one another, and
the bars are arranged in a manner in each case guided and mounted in a longitudinal bearing arrangement so as to be displaceable along their longitudinal axes.

5. The spring system as claimed in claim 2, wherein
a ratio of the translational movement of the bars along their respective longitudinal axis is defined via a ratio of radii of the transmission wheels.

6. The spring system as claimed in claim 2, wherein
one of the bars, which engages with one of the transmission wheels having a smaller radius in comparison with another one of the transmission wheels, is connected to the at least one negative stiffness, and
another one of the bars engages with the other one of the transmission wheels having a larger radius, and is connected to the tuned-mass absorber.

7. The spring system as claimed in claim 6, wherein
the translational transmission has an adjustment drive with a drive wheel, and
the drive wheel is in engagement with one of the transmission wheels.

8. The spring system as claimed in claim 6, wherein
the adjustment drive is a hydraulic motor.

9. The spring system as claimed in claim 1, wherein
the translational transmission is a hydraulic transmission.

10. The spring system as claimed in claim 9, wherein
the translational transmission, as the hydraulic transmission, comprises hydraulic pistons which have different piston surface areas for realizing transmission ratios.

11. The spring system as claimed in claim 9, wherein
the translational transmission, as the hydraulic transmission, has an adjustment drive as a hydraulic pump or hydraulic motor.

12. The spring system as claimed in claim 11, wherein
the adjustment drive has an electric drive component and a hydraulic outlet which interacts with the hydraulic transmission.

13. The spring system as claimed in claim 1, wherein the at least one negative stiffness comprises at least one plate spring or at least one leaf spring.

14. A vehicle, comprising:
    wheels; and
    spring systems according to claim 1,
    wherein the wheels are coupled to the vehicle via the spring systems.

15. The vehicle system as claimed in claim 14, wherein the vehicle is a utility vehicle.

16. A method for adapting a stiffness of a spring system of a vehicle, the method comprising:
    providing a spring system which has a first spring/damper unit with a first stiffness and a first damping, a second spring/damper unit with a second stiffness and a second damping, and an additional mass as a tuned-mass absorber;
    coupling at least one negative stiffness to the tuned-mass absorber by way of a translational transmission; and
    adapting the stiffness of the spring system and simultaneously isolating a vehicle body by way of the translational transmission coupled to the at least one negative stiffness and to the tuned-mass absorber.

17. The method as claimed in claim 16, wherein a setting of a working point of the translational transmission and/or a regulation of a level of the vehicle body are/is realized via an adjustment drive which engages with the translational transmission.

\* \* \* \* \*